United States Patent [19]

Reynolds et al.

[11] Patent Number: 4,903,219

[45] Date of Patent: Feb. 20, 1990

[54] METHOD OF IDENTIFYING FLAG BITS

[75] Inventors: Neal S. Reynolds, Schaumburg; Robert Woodbury, Carpentersville; Robert J. Rzadzki, Crystal Lake, all of Ill.

[73] Assignee: Sun Electric Corp., Crystal Lake, Ill.

[21] Appl. No.: 148,972

[22] Filed: Jan. 27, 1988

[51] Int. Cl.⁴ .................... G06F 11/00; G06F 11/30; G06F 15/74

[52] U.S. Cl. .................................. 364/550; 364/580; 364/300; 371/29.1; 371/51.1

[58] Field of Search ...................... 364/431.11, 431.05, 364/431.03, 551.01; 123/480, 456; 371/29, 20

[56] References Cited

U.S. PATENT DOCUMENTS

| Re. 31,582 | 5/1984 | Hosaka et al. | 371/20 |
| 4,379,332 | 4/1983 | Busser et al. | 364/431.11 |
| 4,393,498 | 7/1983 | Jackson et al. | 371/29 |
| 4,394,742 | 7/1983 | Crummer et al. | 364/580 |
| 4,463,729 | 8/1984 | Bullis et al. | 123/435 |
| 4,551,803 | 11/1985 | Hosaka et al. | 364/431.05 |
| 4,562,728 | 1/1986 | Timmerman | 364/551.01 |
| 4,751,633 | 6/1988 | Henn et al. | 364/200 |
| 4,752,899 | 6/1988 | Newman et al. | 340/52 R |

Primary Examiner—Felix D. Gruber
Attorney, Agent, or Firm—Nicholas A. Camasto

[57] ABSTRACT

A technique for determining and resetting one or more flags in a digital word in memory in which the flags comprise added bits in known locations different from any of the magnitude bits in the word. A sign bit is included and a flag is set by making its bit value differ from that of the sign bit. A digital word from the memory is AND'd with a bit mask to check the flag bit location. A parity routine is run to determine whether the flag bit is set, and if so, the memory location of the word and the type of flag is recorded. The word with the flag bit set is XOR'd with another bit mask to reset the flag bit so that the word may be returned to its memory location with the flag reset.

10 Claims, 4 Drawing Sheets

METHOD OF IDENTIFYING FLAG BITS

CROSS REFERENCE TO RELATED APPLICATIONS

This application is related to copending applications Ser. No. 148,973, filed 1/27/88 entitled Flag Generation System and Ser. No. 148,974, filed 1/27/88 entitled Dual Ported Speed Up Memory, both of which are hereby incorporated by reference and all of which are assigned to Sun Electric Corporation.

BACKGROUND OF THE INVENTION AND PRIOR ART

This invention relates generally to computer based diagnostic test equipment for automotive use, and specifically to a technique for rapidly identifying engine data that has been flagged and stored in memory.

The prior art discloses numerous automobile engine diagnostic testing devices that are computer based. One diagnostic tester, identified as the Sun Electric Corporation Model 2001, is described and claimed in U.S. Pat. No. 4,125,894, issued Nov. 14th, 1978, which is incorporated by reference herein. With such a tester, selected analog signals are gathered from the engine under test by one or more suitable probes connected to the engine and the analog signals received therefrom are manipulated, processed and compared with factory specifications for the engine. The data is also displayed on a raster scan cathode ray tube (CRT) display and a print out of test results is also provided.

A recently introduced diagnostic tester that is IBM compatible is the Sun Electric Corporation Model MCA 3000. The MCA 3000 is capable of receiving and processing engine test signals at significantly higher speeds than prior art testers. The high speed of the MCA 3000 is due largely to its data acquisition system (DAS). With the DAS, analog data and test signals obtained from the engine under test are converted by an analog to digital (A/D) converter and stored in an A/D random access memory (RAM), without the intervention of the main system microprocessor or its address-/data bus.

In copending application Ser. No. 148,973, a system for generating identification flags for signals, acquired from an engine under test and converted by an analog to digital (A/D) converter, to permit their storage in Random Access Memory (RAM) in a retrievable manner is disclosed. The flags identify the beginning of an event, such as a cylinder firing, a cylinder #1 firing, a solenoid dwell cycle and the like. The flag bits are selected to be more significant than any of the magnitude bits used in the digital words. For example, in a sixteen bit digital word having bits D0–D15, eleven bits (D0–D10) are used for magnitude, one bit (D15) is for the sign of the quantity i.e. positive or negative magnitude, and four bits (D11–D14) are utilizable for flags. In the flag system bit D15 is made equal to the A/D sign bit D11. This is referred to as sign extended 2's complement notation. The flags enable identification of the digital words in the A/D RAM memory and facilitate efficient utilization of that data.

The present invention is specifically concerned with a technique for rapidly and efficiently identifying the presence of the flags and enabling the determination of the RAM address locations where flagged data resides. In particular the present invention utilizes a parity check routine that is resident in the system microprocessor controller. The present invention is independent of either of the inventions in the copending applications although the use of all of the inventions together produces a highly beneficial system. It will be noted that the dual ported speed memory of copending application Ser. No. 148,974 enables flag generation completely independent of the system controller. The system controller in the preferred embodiment is the microprocessor in an IBM compatible PC having 640 kilobytes of system memory. An additional 128 kilobyte dual ported RAM comprises the A/D RAM and permits acquiring and storing data by the data acquisition system (DAS) substantially independently. The DAS A/D RAM memory is plugged into a card slot in the IBM compatible PC that is normally reserved for a ROM cartridge. While the entire system is generally described herein, those portions that relate to flag generation and the dual ported speed up memory are specifically described and claimed in the respective copending applications.

OBJECTS OF THE INVENTION

A principal object of the invention is to provide novel flag recognition system in an automotive diagnostic tester.

Another object of the invention is to provide a simplified flag recognition and recovery system for an automotive diagnostic tester.

A further object of the invention is to provide an improved method and apparatus for acquiring and retrieving automotive test data.

BRIEF DESCRIPTION OF THE DRAWINGS

These and other objects and advantages of the invention will be apparent upon reading the following description in conjunction with the drawings in which:

FIG. 6 illustrates recovery and resetting of flags.

DESCRIPTION OF THE PREFERRED EMBODIMENT

The system described utilizes digital words of sixteen bits, (see FIG. 3) but the invention should not be considered as limited thereto. In the system eleven bits (D0–D10) are used to indicate magnitude, a twelfth bit (D11), called the sign bit, is relocated to the fifteenth bit (D15) position and the remaining four bits (D11–D14) are available for use as flags. The preferred embodiment will be described in conjunction with generating and recovering or identifying flags used to denote commencement of any cylinder firing event (also sometimes referred to herein as a cylinder #X event) and to denote commencement of a cylinder #1 firing event. It will be appreciated that the cylinder firing order, as well as other parameters of the engine under test, are inputted to the system, either by the service technician or via software, such as a floppy disk media.

Figure 1:
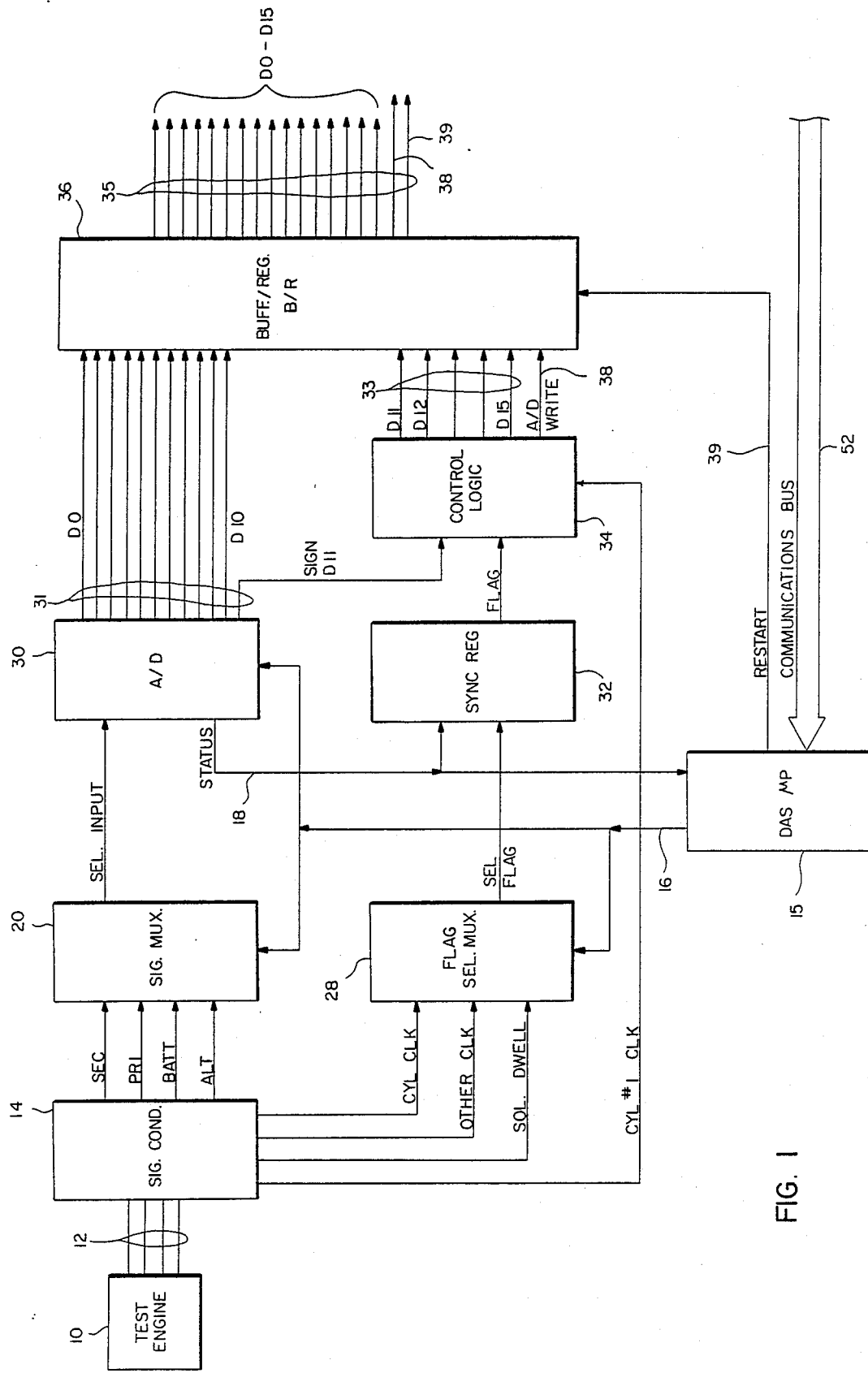
FIG. 1 and FIG. 2 together comprise a block diagram of an automotive diagnostic system utilizing the invention.

In FIG. 1, a test engine is identified by reference numeral 10. A plurality of leads and/or probes 12 is connected to the test engine 10 by the service technician for gathering certain test signals, generally in analog form. The leads 12 are connected to well known signal conditioning apparatus 14, which "cleans up the signals" and develops certain clock signals therefrom. Those indicated are a Cylinder Clock, a Cylinder #1 Clock, an Other Clock, as desired, and a Solenoid Dwell Clock. It will be appreciated that many more signals and data are acquired from the test engine vehicle. Those illustrated are representative only. A plurality of analog signals is supplied from signal conditioner 14 to a signal multiplexer (MUX) 20 that selects which one of the incoming signals is to be supplied, via an output line called selected input, for A/D conversion. This selection is made under control of a DAS microprocessor or controller 15 via a control line 16. The illustrated signals gathered from engine 10 and supplied to MUX 20 are: Primary Ignition; Secondary Ignition; Battery Voltage; and Alternator Current. The clock signals generated by signal conditioner 14 are supplied to a flag selector MUX 28, which is also operated under control of DAS controller 15 via control line 16.

The output of MUX 20 is supplied to an A/D converter 30 which converts the selected analog input signal into 11 bits of data (D0-D10) and a sign bit (D11), all of which are provided on a plurality of output lines 31. The output lines 31 corresponding to bits D0-D10 are connected to a buffer register (B/R) 36 and the output line carrying the sign bit D11 is connected to a control logic block 34. Additionally DAS controller 15 supplies a Restart signal over a line 39 to B/R 36.

Flag select MUX 28 develops a Selected Flag Clock signal at its output. The clock inputs to MUX 28 are a Cylinder Clock, an Other Clock and a Solenoid Dwell Clock. The function of MUX 28 is to provide the Selected Flag Clock signal to a sync register 32. A status line from A/D 30, connected to sync register 32 and to DAS controller 15, apprises controller 15 of when it has completed a conversion. (Controller 15 determines when the requested number of conversions is completed.) The output of sync register 32 is a flag signal that is applied to control logic 34. Other inputs to control logic 34 are the sign bit D11 from A/D 30 and a Cylinder #1 Clock signal from signal conditioner 14. Control logic 34 supplies output signals, corresponding to bits D11-D15 and an A/D write signal on a lead 38, to B/R 36. For data that has no flags, bits D11-D15 are all identical, i.e. either all 0's or all 1's. Thus the combination of leads D0-D10 and D11-D15 provides a sixteen bit input to B/R 36. The output of B/R 36 consists of sixteen leads, carrying bits D0-D15, and two leads carrying the A/D write signal and the Restart signal, respectively. B/R 36 is provided since the signals from A/D 30, control logic 34 and DAS controller 15 are at TTL voltage levels, whereas its signal outputs are carried by a ribbon cable 35 in which the signal voltages are preferably between ±12 volts for improved noise immunity. Ribbon Cable 35 may comprise 18 conductors of a larger group of conductors that is terminated in suitable connectors.

Figure 2:
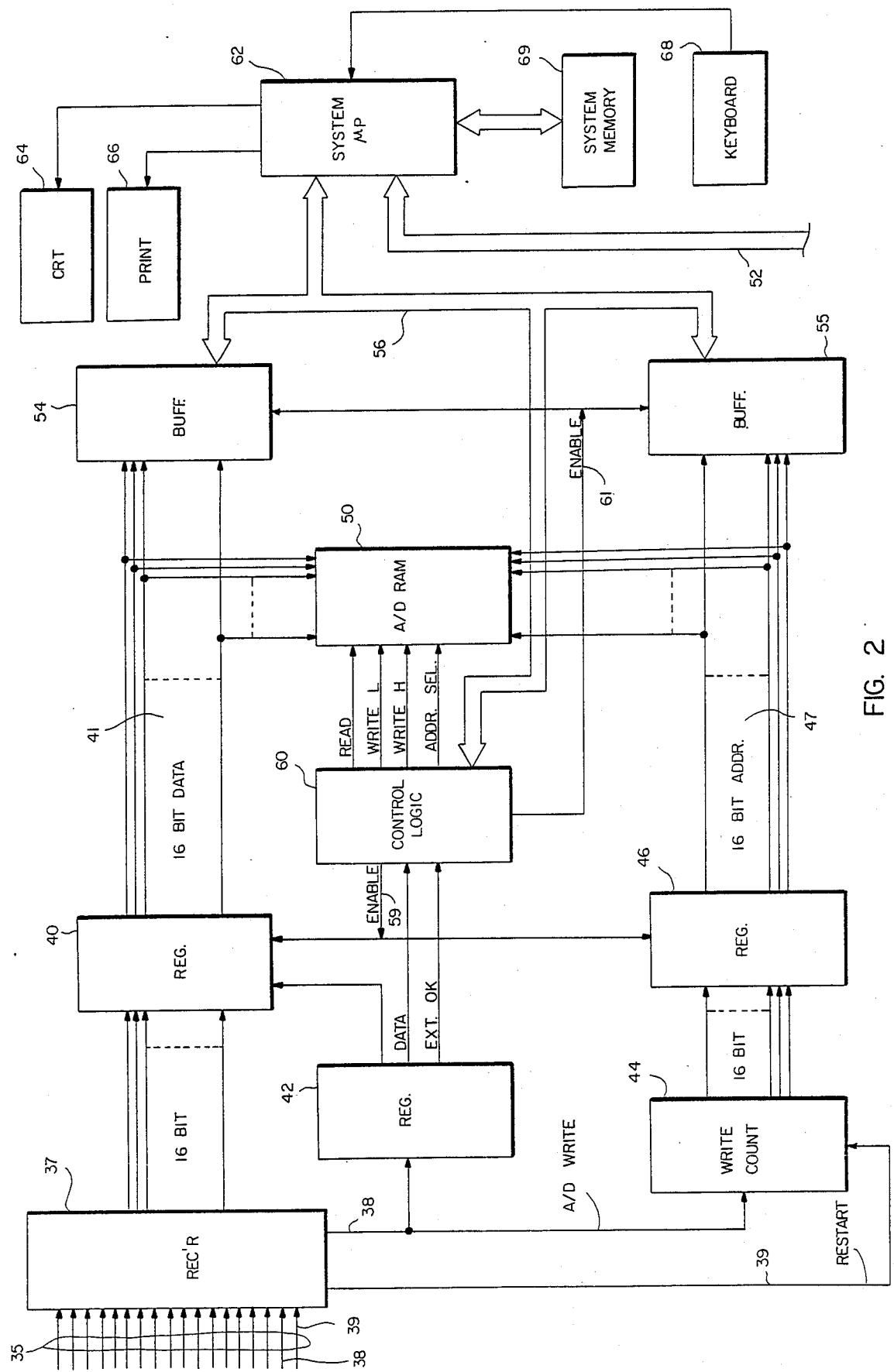

In FIG. 2 the output leads carrying bits D0-D15 and leads 38 and 39 are connected to a receiver 37 where the voltages are transformed back to TTL levels and bits D0-D15 are coupled to a 16 bit register 40. The output of register 40 is carried on a sixteen bit data bus 41 that is connected to an A/D RAM 50 and to a buffer 54. The A/D Write signal on line 38 from receiver 37 is coupled to another register 42 and to a write counter 44. The Restart signal, which acts as a reset, is supplied from receiver 37 to write counter 44. Write counter 44 supplies 16 bits of information to another register 46 which develops the addresses for A/D RAM 50 on a sixteen bit address bus 47. Address bus 47 is connected to another buffer 55 and to A/D RAM 50. Another control logic circuit block 60 receives a Data Available and an External OK signal from register 42 and provides an Enable signal, via a line 59, to registers 40 and 46 and appropriate Read and Write signals and Address Select signals to A/D RAM 50. The buffers 54 and 55 are coupled by a bidirectional communication bus 56 to a system controller 62 and to control logic 60. Operation of buffers 54 and 55 is controlled by another Enable signal from control logic 60 via a line 61. System controller 62 is coupled to DAS controller 15 by another bidirectional communications bus 52. Controller 62 also controls a cathode ray tube raster scan display 64 and a printer 66. A keyboard 68 enables user interface with microprocessor 62 which is also coupled, via a bidirectional bus to a system memory 69.

For convenience in description, it will be understood that a flag is set by making its bit value opposite to that of the sign bit D15. Conversely a flag is reset or removed by making its bit value equal to that of the sign bit D15. It will also be appreciated that the positions of the flags in the preferred embodiment correspond to the higher order bits, but, in the more general case, a flag may occupy any known bit position in the digital word.

Figure 3:
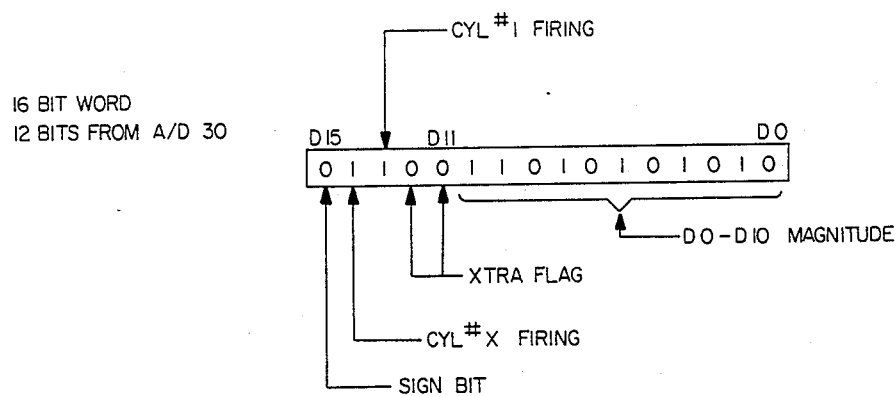
FIG. 3 is a representation of the sixteen bit digital words used in the inventive system.

FIG. 3 illustrates a typical sixteen bit word with bits D0-D10 representing magnitude, bit D15 indicating the sign of the data, flag bits D11 and D12 unset (reset), flag bit D13 set and representing a cylinder #1 firing event (points open) and flag bit D14 set and representing a cylinder #X points open or firing event. It will be appreciated that for other tests, the flags may represent other states, conditions or data. It should also be noted that the system is arranged such that a cylinder #1 flag will not be recognized unless accompanied by a cylinder #X flag. A positive magnitude signal is represented by a sign bit of "0" and a negative magnitude signal is represented by a sign bit of "1". For non-flagged, positive magnitude information, the word in FIG. 3 would have bits D11-D15 all set to "0". Conversely, for negative magnitude non-flagged information bits D11-D15 would all be "1". For a positive magnitude signal with a cylinder #X event, bit D14 is "1" whereas bits D11-D13 and D15 are "0". For a cylinder #1 event, D13 is also "1".

Figure 4:
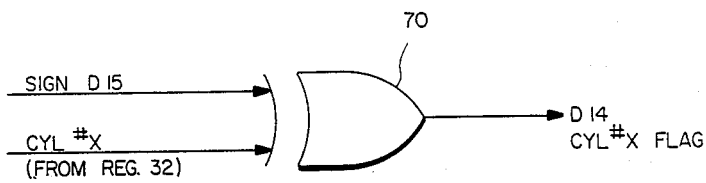
FIG. 4 illustrates circuitry for generating a cylinder firing event flag.

FIG. 4 illustrates how a cylinder #X firing event flag bit (D14) is set to make it opposite to the sign bit. This is accomplished by an exclusive OR gate (XOR) 70 having one input comprising the sign bit D15 and the other input comprising a cylinder #X firing event signal from register 32. The output of XOR 70 represents D14, the cylinder #X flag bit. The characteristics of an XOR or such that its output is high when its input signals differ and is low when its input signals are the same. Thus if the sign bit D15 is "0" (denoting a positive magnitude number) and the cylinder event signal from register 32 is "1" (denoting a cylinder firing event), the output of XOR 70 is "1" and the D14 flag is set, i.e. is made equal to "1" which is opposite the sign bit D15. On the other hand, if there is no cylinder firing event, the output of register 32 is low, as is the sign bit D15, and the output of XOR 70 is also low, indicating that the flag bit D14 is not set.

In operation, the operator or service technician selects the desired test by means of keyboard 68. For the example selected, e.g. secondary voltage waveforms, A/D 30 starts converting on the first Cylinder Clock (points open) condition. Since cylinder #1 is identified and the engine firing order is known, the various cylinder firing events are identified. The analog signals from the test engine are converted into 12 bits of information, (11 bits representing magnitude and one sign bit) by A/D 30. All of the additional four bits may be used for flag selection. These bits are combined with the 12 bits from the A/D 30 to make up the sixteen bit digital words. These words are in turn loaded into A/D RAM 50 under control of address register 46. A/D RAM 50, which has a capacity of 128 kilobytes, may contain about 65,000 conversions of data in sixteen bit words. The information in A/D RAM 50 is a continuous waveform in the sense that no effort is made to compartmentalize the converted data by type as has been necessary in the prior art. The conversions are put into A/D RAM 50 serially and the flags enable that information to be rapidly retrieved based upon the selected tests.

Figure 5:
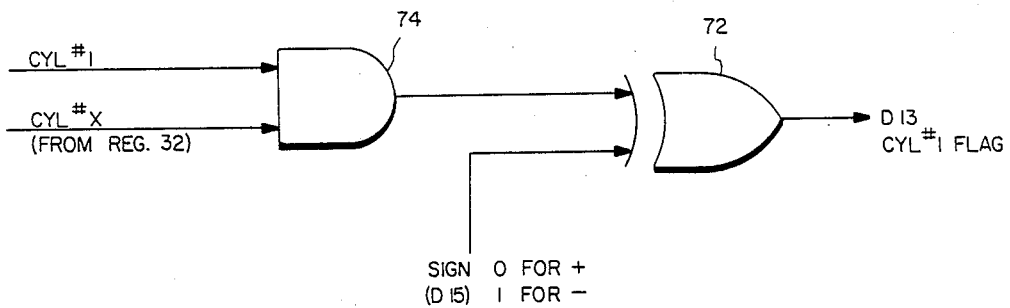
FIG. 5 illustrates circuitry for generating a cylinder #1 firing event flag.

In FIG. 5 the logic arrangement for setting the cylinder #1 flag D13 is shown. An XOR 72 has one input supplied with the sign bit D15 and its other input supplied from the output of an AND gate 74. The inputs to AND 74 are a Cylinder #1 Clock and the cylinder event signal from register 32. AND 74 is provided to assure that the D13 flag is only generated when there is coincidence between a Cylinder #1 Clock signal and a cylinder firing event. Because of the high speed and rapid conversion rate (on the order of 16 microseconds per conversion) of A/D 30, it is possible to have a conversion with a cylinder #1 signal and no cylinder event signal, which is not desirable.

Each conversion is then represented in a sixteen bit address location in A/D RAM 50 with the cylinder firing events and cylinder #1 firing events being flagged by the D13 and D14 data bits. It is a relatively straightforward matter to step through the address locations of the memory to determine whether the D13 and D14 flags have been set and to therefore retrieve that data quite rapidly. Since the system software includes the firing order of the engine under test, when a cylinder #1 event is determined, successive cylinder firing events are immediately known as to the cylinder represented.

In accordance with the present invention a parity testing routine is used to very rapidly identify the flags. The parity routine is in software as are the routines for extracting the flags, resetting them by performing AND and XOR operations with appropriate bit masks, and returning the data to memory without flags (i.e. with the flags reset). The software routines thus identify and extract the flags from the digital data stored in A/D RAM 50 and establish pointer arrays identifying the RAM addresses of the flagged words. In the example selected the flags correspond to cylinder #X firings and cylinder #1 firings. The digital data is returned to A/D RAM 50 with the flags reset (removed) so that further processing of the data in A/D RAM 50 can be accomplished rapidly by the system controller 62 since each 16 bit word in RAM 50 represents pure data. Unless the flags are reset, they will affect the magnitude of the stored data and therefore require added system processor time to find and remove them.

The data is processed one word at a time by "ANDing" it with a suitable bit mask, i.e. one that leaves only the sign bit D15 and the cylinder #X flag bit D14, and "jumping out" of the loop routine if a "parity ODD" is found (i.e. D15 and D14 are of different value). If a parity ODD is not found, the count of the number of words of A/D memory is decremented by one and the loop is run again until either all words have been tested or another flag is found. If a parity ODD is determined, the address of that word is written into the pointer array established for that flag. An XOR operation, with another bit mask, is performed to clear that flag before returning the word to A/D RAM 50. If more than one flag is being used, (for example a cylinder #X and a cylinder #1 flag) another AND routine with a suitable bit mask is run, followed by a parity EVEN check to determine whether the second flag is present. It will be appreciated that "parity EVEN" is used for code simplification but that parity ODD could also be used. If so, its A/D RAM 50 address is identified in the pointer array established for that flag. The word is again XOR'd with a suitable bit mask to clear the second flag before being written back into A/D RAM 50. The number of flags found is compared to the number of flags needed, as established via the keyboard 68 or the test selected. If more flags are required, the routine is repeated for additional memory locations in A/D RAM 50.

Figure 6:
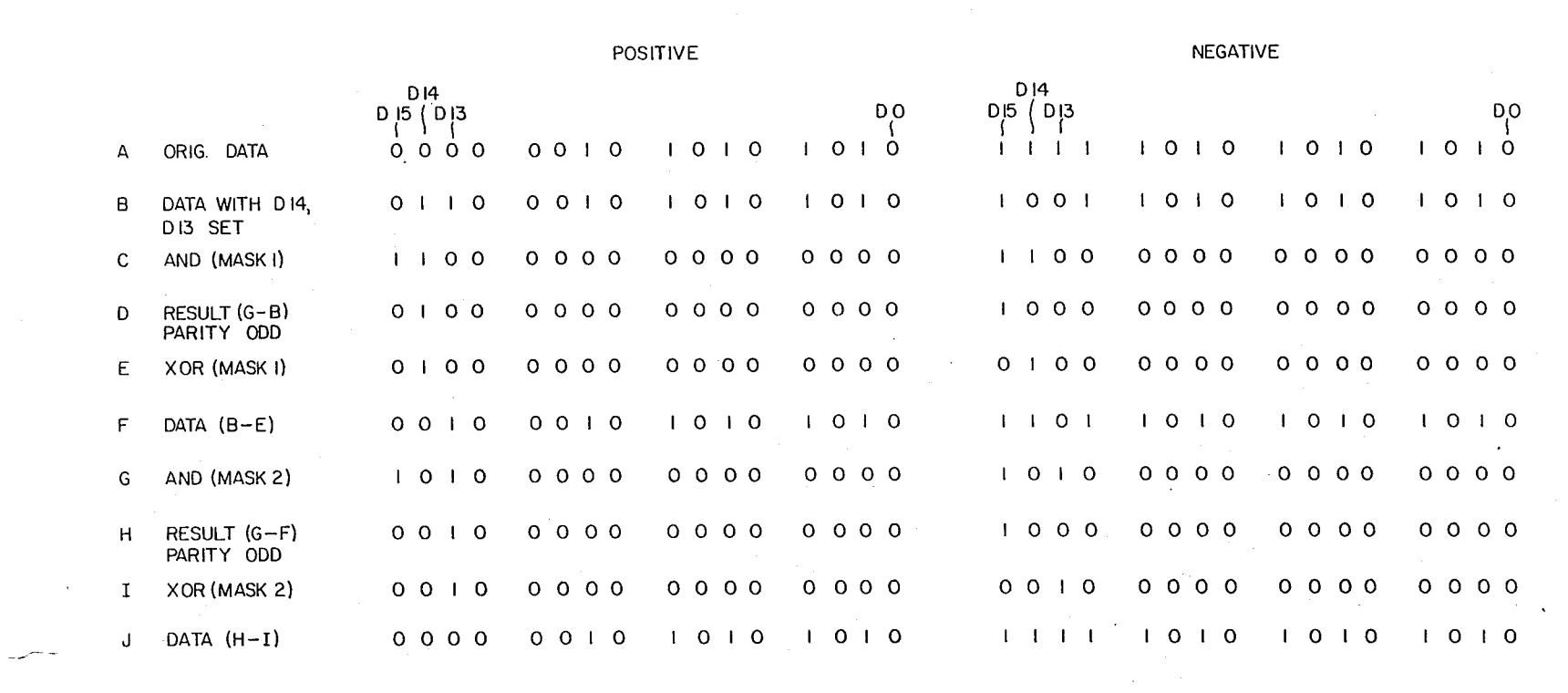

Reference to FIG. 6 will help to clarify the flag identification system. FIG. 6 is divided into two columns, one being for positive magnitude data and another for negative magnitude data. An unflagged data word is shown on line A with bits D15, D14, D13 and D0 identified. On line B, the data word has been altered by setting the D14 and the D13 flags to indicate a cylinder #X firing event and a cylinder #1 firing event, respectively. The first AND bit mask to test for a D14 flag is shown in line C and consists of D15 and D14 being set ("1") and the remainder of the bits being "0". Line D shows the result of ANDing the digital words on lines B and C. At this point the parity test shows a parity ODD condition for both the positive and negative words on line D. That indicates that there is a D14 flag in the word on line B.

The next step is to XOR the data word on line B with a suitable bit mask to reset the D14 flag, as shown on line E where D14 is "1". The result is the data word on line F, which will be seen to correspond to the data word on line B with the D14 flag reset.

To test for a D13 flag, the data word on line F is AND'd with the bit mask on line G consisting of a data word with D15 and D13 being "1" and D14 being "0". Line H shows this result. A parity test is again made, giving a parity ODD result for both the positive and negative data words on line H. It follows that the D13 flag must be reset. To reset the D13 flag, another XOR bit mask is used, as indicated on line I, resulting in a data word on line J that corresponds with the unflagged data word on line A.

By simply ANDing with bit masks selected for the flags to be identified, running parity tests and XORing with other suitable bit masks, the data word may be returned to AD/RAM 50 with the flags reset, and the location of the flags stored in pointer arrays in system memory. While the example in FIG. 6 is concerned with particular flags, i.e. the cylinder flags, it should be apparent to those skilled in the art that any type of flag can be similarly treated. The flag identification software routine is reproduced below.

The above described parity testing routine takes advantage of the fact that a sign bit D15 is provided in the digital word and that a flag bit is set by making its bit value opposite to that of the sign bit. This digital word arrangement in conjunction with the ANDing and XORing bit masking enables a very fast, reliable technique for finding and resetting the flags in the data.

spirit and scope. The invention is to be limited only as defined in the claims.

What is claimed is:

---

PUBLIC AD_FIND_FLAGS

NAME
    ad_find_flags-find a/d flags in a/d memory.

SYNOPSIS
    count = ad_find_flags (das_mem_adr, das_mem_len, unsorted_array, max_count, cyl_one_array);

| | | |
|---|---|---|
| int count; | AX | Actual number of flags found |
| int *das_mem_adr; | [BP+6] | DAS A/D Memory Address |
| int das_mem_len; | [BP+10] | DAS A/D Memory length |
| int **unsorted_array; | [BP+12] | Addr of array of pointers to each flag |
| int max_count; | [BP+16] | Maximum number of flags to look for |
| int *cyl_one_array; | [BP+18] | Cyl one index array address |

DESCRIPTION
    This function scans the a/d memory starting at the given segment looking for the firing flags. A piece of data is "flagged" if the sign bit (#15) and the flag bit (#14) are different. because the a/d data is only 12 bits this flag can never occur naturally in the data. As each flag is found, a pointer to it is placed in the return_array. And the flag is removed. This search terminates when max_count flags have been found or when the entire a/d memory segment has been scanned. The function has now been enhanced to look for the CYLONE flag. The function has now been enhanced to take a 32 bit pointer for the DAS memory address and an integer for the length.

| | | |
|---|---|---|
| 03-25-86 | RDW/NSR Wrote original routine. | |
| 12-16-87 | NSR The offset of every cyl one found is returned, instead of just the first. | |
| 01-07-88 | NSR The aforementioned cyl one array is now bytes, not ints. | |

```
AD_FIND_FLAGS PROC FAR  Called from C program
        PUSH    BP              Save base pointer
        MOV     BP,SP           Set base pointer to stack
        PUSH    DS              Save data segment register
        PUSH    ES              Save extra segment register
        LDS     SI,[BP+6]       DS:SI has DAS memory address
        MOV     CX,[BP+10]      Initialize number of words to check
        LES     DI,[BP+12]      ES:DI points to unsorted buffer
        XOR     BX,BX           Initialize number of flags found
        XOR     DX,DX           Initialize segment counter
        CLD                     Set direction flag forward
NXTWRD: LODSW                   Get next word into ax (16)
        AND     AH,0C0H         Save only upper 2 bits (4)
        JPO     FLAG            If they are different, we found a flag (4).
        LOOP    NXTWRD          If not done, get next word (17)
        JMP     DONE            All done . . .
FLAG:   DEC     SI              Decrement pointer by 2 so it will
        DEC     SI              point to the last word
        XOR     [SI],4000H      Invert flag bit (#14), this clears the flag
        MOV     AX,SI           Get offset for this flag
        STOSW                   Store it in the return array
        MOV     AX,DS           Get segment for this flag
        STOSW                   Store it in the return array
        INC     BX              Increment number of flags found
        TEST    BYTE PTR [SI+1],0A0H   Check for "cylinder one" flag (b13)
        JPE     CONT            If set store the table position #
        XOR     BYTE PTR [SI+1],020H   Invert bit #13, clearing flag
        PUSH    ES              Save unsorted buffer pointer
        PUSH    DI
        LES     DI,[BP+18]      Get cyl one offset array pointer
        MOV     ES:[DI],BL      Store integer offset of lastest cyl one
        INC     Word Ptr        Increment array pointer
        [BP+18]
        POP     DI              Restore unsorted buffer pointer
        POP     ES
CONT:   CMP     BX,[BP+16]      Have enough flags yet?
        JL      NXTWRD          If not, jump back
DONE:   MOV     AX,BX           Return number of flags found
        POP     ES              Restore extra segment
        POP     DS              Restore data segment
        POP     BP              Restore base pointer
        RET                     All done, return
AD_FIND_FLAGS ENDP
```

---

What has been described is a novel system for gathering and identifying test data from an engine under test. It is recognized that numerous modifications and departures from the described invention will be apparent to those skilled in the art without departing from its true 1. A method of identifying flag bits in signals gathered from an automotive engine and placed in a memory comprising a plurality of digital words having a fixed number of bits denoting magnitude one bit denoting sign and a flag bit in a known bit position, the flag being set when the bit value of the flag bit differs from that of the sign bit, comprising the steps of:

processing a digital word read out from a specific memory location to produce a digital result having the sign bit and the flag bit isolated;

conducting a parity test on the digital result to determine if the flag is set;

storing the memory address of a digital word in which the flag is set; and repeating the steps for another digital word from the memory.

2. The method of claim 1 in which a second flag bit may be set and comprising the steps of:

repeating said processing step to isolate the sign bit and the second flag bit; and conducting a parity test to determine whether the second flag is set.

3. A method of identifying flagged data in a memory in which data consists of digital words having a fixed number of bits representing magnitude and other bits in known bit positions including a sign bit representing the sign of the data and first and second flag bits corresponding to a cylinder #X firing event and a cylinder #1 firing event, respectively, a flag being set by having its bit value made opposite to that of the sign bit, comprising the steps of:

processing a digital word from the memory to isolate the sign bit and the first flag bit to produce a first digital result;

conducting a parity test on the first digital result to determine whether the first flag bit is set;

storing the memory address of the digital word if the first flag bit is set; and if set processing the digital word to isolate the sign bit and the second flag bit to produce a second digital result;

conducting a parity test on the second digital result to determine whether the second flag bit is set; and storing the memory address of the digital word if the second flag bit is set.

4. A method of locating and processing flag bits in data in a memory characterized by a plurality of digital words having a fixed number of bits relating to magnitude, a sign bit and one or more flag bits in known bit positions, a flag being set by making its bit value opposite to that of the sign bit, comprising the steps of:

processing a digital word to isolate the sign bit and a first flag bit;

conducting a parity test to determine whether the first flag bit is set; and if set resetting the first flag in the digital word;

storing the memory address of the digital word and information indicating that the first bit is set; and writing said digital word back to said memory with said first flag bit reset.

5. The method set forth in claim 4 in which a second flag bit may be set and comprising the steps of:

repeating said processing step to isolate the sign bit and the second flag bit, conducting a parity test to determine if the second flag is set; and resetting said second flag bit;

storing the memory address of the digital word and information indicating that the second flag bit is set; and writing the digital word back into memory with the first and the second flag bits reset.

6. A method of identifying flags in signals gathered from an automotive engine and placed in a RAM memory comprising a plurality of digital words, each signal having a magnitude defined by a fixed number of bits and flags defined by higher order bits than said fixed number of bits, and each said digital word including a sign bit, a flag being set when its bit value is opposite to that of the sign bit, comprising the steps of:

ANDing a digital word from the memory with a masking word in which all bits except the sign bit and a flag bit are masked to produce a first digital result;

conducting a parity test of the first digital result to determine whether the flag is set;

storing the RAM memory address of the digital word if the flag is set; and repeating the process for another word from the memory.

7. The method of claim 6 wherein a second flag may be set, comprising the additional steps of:

ANDing the digital word with another masking word in which all bits except the sign bit and the second flag bit are masked to produce a second digital result; and conducting a parity test of the second digital result to determine whether the second flag is set.

8. A method of identifying flagged data in a memory in which the data consists of digital words having a fixed number of bits representing magnitude and a group of more significant bits representing the sign of the data and first and second flag bits corresponding to a cylinder #X firing event and a cylinder #1 firing event, respectively, a flag being set by having its bit value made opposite to that of the sign bit, comprising the steps of:

ANDing a digital word from the memory with a masking word in which all bits except the first flag bit and the sign bit are masked;

conducting a parity test on the result to determine whether the first flag bit is set;

storing the memory address of the digital word if the first flag bit is set; and if the first flag bit is set ANDing with another masking word to mask all bits except the sign bit and the second flag bit;

conducting a parity test on the result to determine whether the second flag bit is set;

storing the memory address of the digital word if the second flag bit is set.

9. A method of locating flag bits in a memory characterized by a plurality of digital words having a fixed number of bits relating to magnitude, a sign bit and one or more higher order flag bits, a flag being set by making its bit value opposite to that of the sign bit, comprising the steps of:

ANDing a digital word with a masking word for masking all bits except the sign bit and the first flag bit;

conducting a parity test on the result to determine whether the first flag bit is set;

XORing the digital word with a masking word to reset the first flag bit;

storing the memory address of the digital word and information indicating that the first flag bit is set; and writing said digital word back to said memory with said first flag bit reset.

10. The method set forth in claim 9 in which a second flag bit may be set and comprising the additional steps of:

repeating said steps of ANDing and XORing with appropriate masks for determining and resetting said second flag bit;

storing the memory address of the digital word and information indicating that the second flag bit is set; and writing the digital word back into memory with the first and the second flag bits reset.

* * * * *

UNITED STATES PATENT AND TRADEMARK OFFICE
CERTIFICATE OF CORRECTION

PATENT NO. : 4,903,219

DATED : February 20, 1990

INVENTOR(S) : Neal S. Reynolds, Robert Woodbury and Robert J. Rzadzki

It is certified that error appears in the above-identified patent and that said Letters Patent is hereby corrected as shown below:

Column 2, line 5, after "speed", insert --up--;

Column 4, line 56, delete "or", insert --are--.

Signed and Sealed this

Fourth Day of December, 1990

Attest:

HARRY F. MANBECK, JR.

Attesting Officer

Commissioner of Patents and Trademarks